United States Patent [19]

Bradshaw

[11] 4,197,714
[45] Apr. 15, 1980

[54] SYSTEM AND METHOD FOR LIQUID ABSORPTION AIR CONDITIONING

[75] Inventor: Norman F. Bradshaw, Surrey, England

[73] Assignee: Schweitzer Industrial Corporation, Madison Heights, Mich.

[21] Appl. No.: 966,010

[22] Filed: Dec. 4, 1978

Related U.S. Application Data

[63] Continuation-in-part of Ser. No. 912,322, Jun. 5, 1978, abandoned.

[51] Int. Cl.² .................. F25D 17/06; F25D 23/00
[52] U.S. Cl. ............................................. 62/94; 62/271
[58] Field of Search ................................. 62/94, 271

[56] References Cited

U.S. PATENT DOCUMENTS

| | | | |
|---|---|---|---|
| 2,156,293 | 5/1939 | Kaufman | 62/271 |
| 2,690,656 | 10/1954 | Cummings | 62/271 |
| 3,200,606 | 8/1965 | Hewett et al. | 62/94 |
| 3,350,892 | 11/1967 | Kelley | 62/94 |
| 4,011,731 | 3/1977 | Meckler | 62/271 |

Primary Examiner—Lloyd L. King
Attorney, Agent, or Firm—Krass & Young

[57] ABSTRACT

A system and method for conditioning the air supplied to a paint spray booth enclosure in which the air is dehumidified during summertime operation by liquid absorption of the water vapor from the incoming air.- The circulated absorption liquid is cooled to eliminate the heat developed by the dehumidification by a portion of the heat being rejected into the air exhausted from the paint spray booth. In one version, heat pump units are used to extract the remaining portion of the rejected heat with the extracted heat transferred to a regenerator heat exchanger utilized to provide heat to reconcentrate the liquid absorption solution. The heat pumps are also utilized to cool the supply air and the heat so extracted is also used to heat the absorption liquid during regeneration. During wintertime operation, the heat pump units extract heat from the exhaust air of the paint supply booth of the heat exchanger arrangement and transfer it into a heat transfer loop utilized to preheat the incoming air as well as to heat a dilute solution of the absorption liquid used to humidify the air. In another version, the cooled exhaust air from the spray booth directly cools the absorption liquid and the incoming ambient air by an air-to-liquid heat exchanger, and a secondary waste heat source is utilized in regeneration of the absorption liquid.

18 Claims, 4 Drawing Figures

SYSTEM AND METHOD FOR LIQUID ABSORPTION AIR CONDITIONING

CROSS REFERENCE TO RELATED APPLICATION

This application is a continuation-in-part of Ser. No. 912,322, filed June 5, 1978, now abandoned.

BACKGROUND DISCUSSION

This invention concerns air conditioning systems and more particularly a conditioning system adapted to carry out chemical or liquid solution absorption of the air moisture to achieve dehumidification.

In copending applications, Ser. No. 882,345, filed Mar. 1, 1978 and Ser. No. 887,156, filed Mar. 16, 1978, air supply systems for paint spray booths are described. Such systems are utilized in order to condition ambient air prior to being circulated through a paint spray booth. Paint spraying operations are carried out on products such as automotive car bodies and similar production items, and in order to provide healthful working conditions, a fresh supply of incoming air is continuously either cooled or heated, dehumidified or humidified, and exhausted to the atmosphere after passing through the booth.

As described in these patent applications, a critical aspect of the air supply system is the maintenance, during winter and summer, of the relative humidity of the air supply for paint spraying water based paints.

Typically, during summertime operation, the relative humidity must be reduced from ambient levels since the relative humidity is usually well above the relative humidity level required to be maintained (50%). Particularly, this is so since the air temperature is usually reduced by the conditioning process, raising the relative humidity.

Conversely, during wintertime operation, the relatively cold, dry outside air upon being heated must be adjusted in humidity so as to raise the relative humidity of the incoming air supplied to the paint spray booth.

Various conventional methods have been utilized in the past in order to carry out the dehumidification.

In one method, the air is chilled to a dew point temperature which corresponds to the correct relative humidity, which dew point temperature is well below the dry bulb temperature of the air supplied to the paint spray booth, and then reheated to the appropriate dry bulb temperature to thus achieve the proper relative humidity.

Another system which has been utilized is the so-called chemical or liquid absorption system. This system relies on the use of a chemical salt solution such as lithium chloride or other suitable materials such as ethylene glycol in a water solution. Such solutions exhibit the characteristic of a reduced vapor pressure of the water above such solutions as compared to pure water. Thus, if the existing vapor pressure of the water vapor in the incoming air is above such reduced vapor pressure, the result is that the ambient water vapor is condensed into the solution.

In practice, the solution is sprayed into the incoming air and collected in a collection pan and recirculated to be resprayed in the system. The moisture in the air being condensed into the solution, the latent heat of condensation is absorbed into the solution. In addition, the incoming air is commonly at a higher temperature than the absorption solution and the solution is therefore heated by direct heat transfer between the air and the sprayed solution. Finally, there is also released a so-called heat of dilution as the condensed moisture passes into the solution.

The phenomenon of liquid absorption, depending on the reduced vapor pressure exhibited by the solution, is only effective when the temperature of the solution is sufficiently low since with increasing temperatures of the solution, the vapor pressure would increase to a point whereat liquid absorption would no longer take place or would take place at inadequate rates.

Thus, as the heat from the various sources is absorbed by the solution, the temperature of the solution is increased and must be reduced, i.e., heat extracted or rejected in order to maintain the effectiveness of the process.

Conventional systems commonly sought to eliminate the heat generated by the use of evaporative cooling towers. While this is generally satisfactory, the use of evaporative cooling towers entails considerable capital expense and in addition places relatively severe constraints on the temperature to which the solution may be reduced. That is, the evaporative cooling is limited in the temperature to which the water may be reduced, of the order of 87° F. for a design summer peak condition of 96° F. ambient.

In addition to the solution cooling requirements, the effectiveness of the solution also depends on the concentration of the solution. As the moisture passes into the solution, the resultant dilution reduces the effectiveness of the process, requiring the regeneration or reconcentration of the solution as the process proceeds. The usual method for reconcentrating the solution is to heat the same and pass ambient air over a spray of the dilute solution, the relatively elevated temperature levels of the solution allowing the ambient air to carry out the moisture, thus achieving the reconcentration.

Since typically, the ambient air is at relatively high humidity levels, the solution must be heated to a relatively high temperature, requiring the expenditure of considerable heat. Such heat is supplied by an external heat source such as a steam boiler. This thus requires a supply of steam and also entails the expenditure of energy which is growing more and more costly and is of reduced availability in recent times.

While some systems employ a heat exchange between the absorption liquid in the primary circuit and the regenerator circuit, the process still requires considerable cooling and heating capability.

It is accordingly the object of the present invention to provide for a system and method for liquid absorption humidity conditioning of an air supply in which the need for equipment and energy is greatly reduced over that required in conventional systems.

SUMMARY OF THE INVENTION

This and other objects of the present invention, which will become apparent upon a reading of the following specification and claims, are accomplished by a system in which a mechanical refrigeration unit acting as a heat pump is coupled with a heat transfer arrangement associated with the air exhausted from the paint spray booth and an absorption liquid circuit, in which concentrated liquid is sprayed into the incoming air during summertime operation to dehumidify the air.

During the summertime operation, a portion of the heat generated by the condensation of atmospheric moisture into the absorption liquid is transferred out of the circulated absorption liquid into the air exhausted from the spray booth in order to cool the solution. In one version, the remaining portion of the heat is absorbed by a refrigeration unit acting as a heat pump, extracting heat from a heat transfer medium circulated through an exhaust air coil and a heat exchange unit absorbing heat from the circulated liquid solution. The heat pump also extracts heat from a heat transfer medium circulated into a cooling coil which cools the air supply prior to being introduced into the paint spray booth. The heat which is extracted is pumped into the heat pump condenser coils and transferred into a regenerator heat exchanger to provide heat for the reconcentration process.

During wintertime operation, heat is extracted from the exhaust supply air in the same coil located in the exhaust ducting and transferred into a heat exchanger employed for heating of a dilute solution of the absorption liquid for the purposes of humidification of the air supply, as well as to supply a heating coil utilized to preheat the air supply. The system thus eliminates the use of evaporative cooling towers to reject the heat removed from the absorption liquid and extracts the energy represented by the heated or cooled air exhausted using the exhaust air either as a heat sink in cooling the liquid absorption solution, or as a heat source in preheating the incoming air. The heat extracted from the solution is transferred by the heat pump unit into the heating process for regeneration of the liquid in the solution for a relatively high efficiency process.

In another version, during summertime operation, the heat is transferred out of the absorption liquid prior to the absorption cycle, into the relatively cool air exhausted from the paint spray booth. This is achieved by the use of a direct air-to-liquid heat exchanger which receives the respective fluids. This also achieves a precooling of the incoming ambient air. The regeneration of the absorption liquid is also assisted by the use of hot gases received from a secondary waste heat source.

DETAILED DESCRIPTION

In the following detailed description, certain specific terminology will be utilized for the sake of clarity and a particular embodiment described in accordance with the requirements of 35 USC 112, but it is to be understood that the same is not intended to be limiting and should not be so construed inasmuch as the invention is capable of taking many forms and variations within the scope of the appended claims.

As described above, according to the concept of the present invention, the system provides a means for utilizing the exhaust air to absorb at least a portion of the heat required to be removed from the absorption solution circulated through the dehumidification system during warm weather operation. In addition, in one version of the invention, a portion of the heat extracted is extracted by a heat pump absorbing the remaining portion of the heat as well as heat removed from the supply air in cooling of the air supply. The heat rejected by the heat pump provides the heat required to heat the dilute solution of absorption liquid to a sufficiently elevated temperature for the reconcentration process. This heat transfer arrangement includes a heat pump comprised of a refrigeration unit having evaporator and condenser coils, with the heat transfer medium passed about the evaporator coils to absorb heat therefrom. A heat transfer medium is circulated about the condenser coils to provide the transfer of heat into a heat exchanger about which the dilute solution is circulated and which is heated thereby. In this version, the transfer of heat into or out of the exhausted air is accomplished by a heat exchanger coil positioned in the exhaust ducting.

During wintertime operation, the heat pump transfers heat from the exhaust air into the incoming air by a heat transfer arrangement between the refrigeration unit evaporator and condenser coils in a heat transfer circuit including a preheater coil positioned to heat the incoming air. The same heat transfer circuit is also utilized to heat the dilute solution utilized to humidify the air in the wintertime operation.

Figure 1:
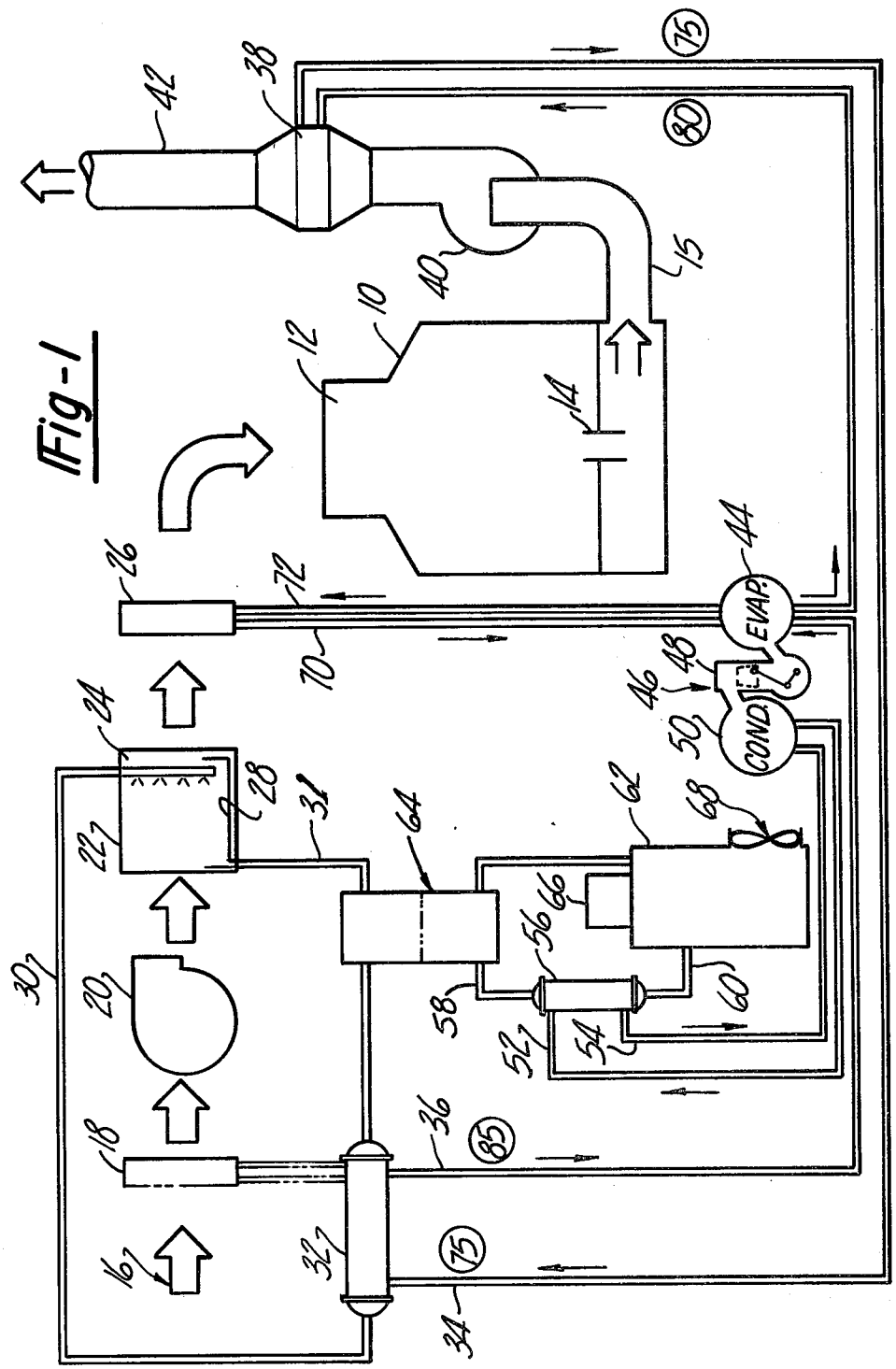
FIG. 1 is a schematic diagram of a system according to the present invention depicted in summertime operation.
Figure 2:
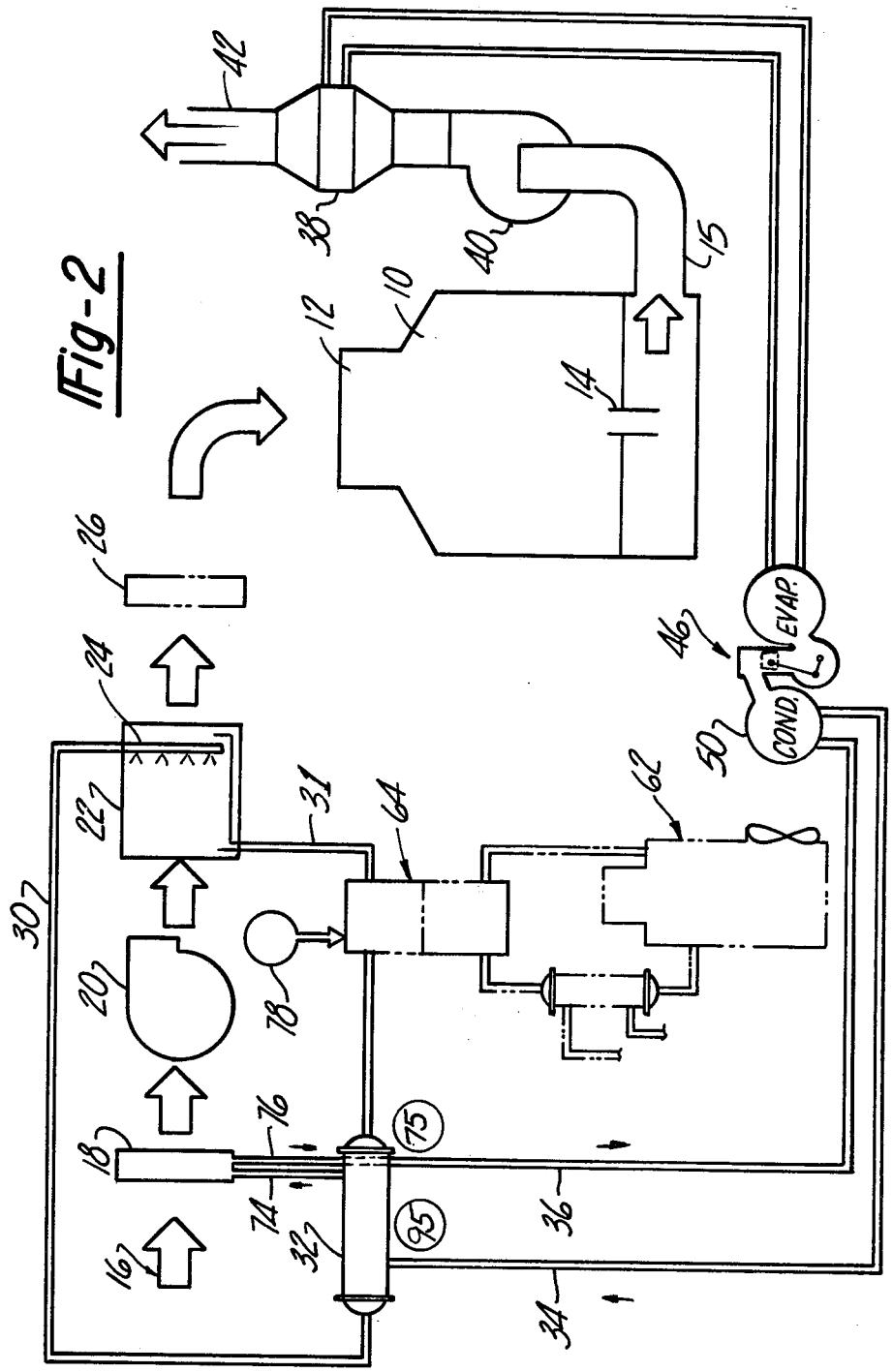
FIG. 2 is a schematic diagram of the air conditioning system depicted in FIG. 1 during wintertime operation.

These arrangements are depicted schematically in FIGS. 1 and 2. This system is included in the system for conditioning the supply of air to an enclosure such as the paint spray booth depicted at 10, which is advantageously of the design described in copending application Ser. No. 882,345, filed Mar. 1, 1978.

In such design, the enclosure 10 receives the air supply through the plenum space 12 with the air exiting through tubular openings 14 in the floor which also receive a filtering water flow such that the exhaust air is filtered to remove the solid particulate matter such as paint pigment in the overspray to a very high degree. The air so-filtered is exhausted through an exhaust plenum 15.

The paint spray enclosure is supplied with air by a conditioning system in accordance with the present invention to be of a controlled relative temperature and humidity, typical conditions being 50% relative humidity and 75° F.

It is to be understood that the depiction of the present system in FIGS. 1 and 2 is merely schematic and omits many of the conventional components and structural details so as to render a more ready understanding of the invention. Such details such as the system controls, duct work, manifold valving, circulating pumps, filtration units, etc., have accordingly not been included in FIGS. 1 and 2, but would be included in the actual implementation of the system. Supplemental heating and cooling which may be necessary to balance the system may also be incorporated.

The incoming air supply, indicated by the arrow 16, is drawn through a heating coil 18 which, as indicated by the phantom lines in FIG. 1, is not operative during summertime operation. The air supply drawn by the circulating blower 20 is passed into a dehumidification chamber 22 and passed over a spray nozzle array 24 which sprays the liquid absorption solution such as lithium chloride or ethylene glycol in water, into the incoming air which, by the reduced water vapor pressure over the solution, serves to absorb or condense moisture from the air.

After being dehumidified, the air supply is circulated over a cooling coil 26 to chill the air to its required dry bulb temperature, i.e., 75° F., and thence is passed into the plenum space 12.

The absorption liquid is collected in a tray 28 and recirculated through flow lines 30 and 31 for cooling and reconcentration of the diluted solution.

The cooling of the absorption liquid takes place in a heat exchanger 32 through which is circulated a heat transfer medium entering line 34 and returned via line 36.

The heat transfer means for transferring heat into and out of the exhaust air includes a heat transfer medium, such as brine, and an extraction coil 38 located in the exhaust ducting means associated with the paint spray booth 10.

A blower 40 directs the exhaust air in the exhaust duct 15 through the extraction coil 38 to a vent stack 42 which directs the air to the outside.

The high efficiency filtration of the air allows the use of an air-to-liquid or air-to-air extraction coil without fouling the surfaces thereon, as discussed more completely in the aforementioned patent applications.

The air passing through the plenum is relatively cool, having been cooled in the cooling coil 26 and further evaporatively cooled by the water filtration of the air and thus provides a heat sink for rejecting the heat generated by the humidity absorption process into the outside exhaust air.

The relatively low temperature to which the heat transfer medium circulated in the extraction coil 38 may be reduced is much less than that to which the heat transfer medium may be cooled by means of a cooling tower during summer peak. Correspondingly, this approach allows a much greater reduction in temperature and increased effectiveness of the absorption liquid, i.e., the heat transfer medium typically may be reduced to a temperature of 75° F. as indicated in FIG. 1.

The heat transfer medium circulated through the return line 36 is circulated about the evaporative coils 44 of the mechanical refrigeration unit 46. A portion of the heat extracted from the liquid absorbent circulated in lines 30 and 31 is transferred into the evaporator coils 44 and, by virtue of the operation of the compressor 48, this heat is pumped into the condenser coils 50 of the refrigeration unit. The refrigeration unit 46 thus acts as a heat pump means.

The heat rejected by the condenser coils 50 is rejected into a heat transfer means consisting of lines 52 and 54 through which is circulated a heat transfer medium and a heat exchanger 56. Heat exchanger 56 in turn receives a flow of liquid in lines 58 and 60 which serves to heat a portion of the absorption liquid removed from the primary circulation to a temperature sufficiently high to allow the reconcentration of the absorption liquid in a regenerator 62 by means of evaporative reconcentration.

The line 58 receives dilute solution from the absorption liquid tank 64 which receives a diverted portion of the diluted solution flowing in line 31. The regenerator 62 passes ambient air through a plenum 66 over a spray nozzle arrangement (not shown) with the ambient air drawn in by a blower 68 passed over the heated liquid to cause the moisture laden ambient air to be exhausted to the atmosphere.

Refrigeration unit 46 also provides the cooling of the supply air to a heat transfer means comprising lines 70 and 72 circulating the liquid about the evaporator coils 44 and through the cooling coils 46. This heat is extracted from the supply air and from the absorption liquid and is "pumped" into the condenser coils 50 for use as a heat source for the regenerator 62.

The remaining proportion of heat developed in the dehumidification process is rejected into the exhaust air via the action of extraction coil 38.

Accordingly, no external heat source is required for the regenerator 62 and the necessity for cooling towers to reject the heat generated in the absorption liquid circuit is eliminated.

FIG. 2 depicts the wintertime operation system. In wintertime operation, the incoming air supply indicated at arrow 16 must be heated and humidified. In this instance, the heating coil is in operation and serves to receive the heat transfer liquid via lines 74 and 76. The air is humidified in the humidifier/dehumidifier 22 by spraying a warmed and diluted solution of the liquid absorbent circulated in lines 30 and 31 with water being continuously added to the solution from a water source 78. Thus, the same apparatus may be utilized for humidifying air as dehumidifying without the need for changeover of the solution in the various lines.

The cooling coil 26 is not in operation in this mode such that the supply air after being heated may be humidified and passed into the plenum space 12 and paint spray booth 10.

In this case, the heat rejected in the condenser 50 is transferred into the heat exchange medium in order to carry out the heating of the absorption liquid in the heat exchanger 32, to provide for more ready vaporization of the water in the supply air and thence on to the heating coil 18 to preheat the incoming air.

The refrigeration unit 46 acts as a heat pump and extracts the heat from the exhaust air by the use of the extraction coil 38 and transfers the same into the heat exchanger 32 and into the heating coil 18.

The regenerator 62 and associated circuits are of course not in operation in cold weather operation.

Accordingly, it can be seen that the system and method allow the elimination of the cooling tower and the external heat source to reduce the energy requirement by employing the refrigeration unit normally required for cooling of the supply air as a heat pump to transfer heat from points in the system whereat it must be rejected to points in the system whereat the heat is required and also allows the energy represented by the exhaust air to be partially recovered prior to exhausting of the air to the outside. That is, during summertime operation, the heat generated in the absorption liquid circuit is partially rejected in the exhaust air, with a portion thereof pumped by the heat pump into the regeneration process. During wintertime operation, the heat value of the exhaust air is partially recovered by the system and pumped by the refrigeration unit 46 into the solution heat exchanger and preheated coil. Also, during summertime operation, the temperature to which the absorption liquid may be reduced is much lower than that possible to be achieved in the cooling tower at summer peak such that the dehumidification process may be much more efficiently achieved.

Figure 3:
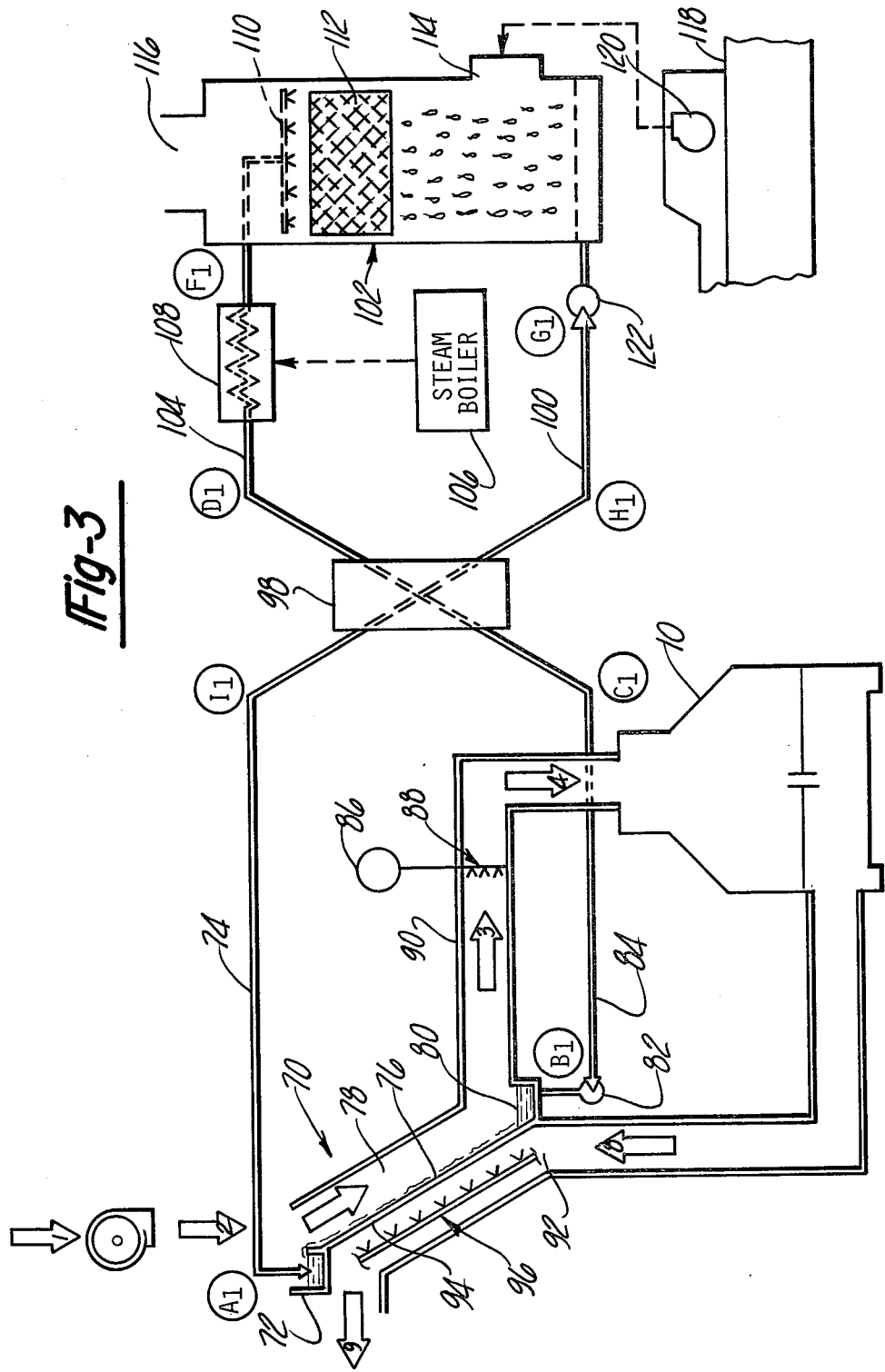
FIG. 3 is a schematic representation of an alternate version of the system according to the present invention.

Referring to FIG. 3, an alternative arrangement for transfer of the heat out of the regenerated, relatively hot, absorption liquid into the cooled exhaust air from the spray booth is depicted schematically. In this arrangement, the incoming ambient air indicated by arrow 2 passes over an air-to-liquid heat exchanger arrangement generally indicated at 70. This also acts to produce contact between the supply air and the absorption liquid in order to carry out the dehumidification of the incoming supply air. This arrangement may include a weir into which the concentrated absorption liquid is passed via supply line 74. The absorption liquid cascades over an extended inclined surface 76 to produce a large surface area in contact with the supply air introduced into the space 78. The absorption liquid is then collected in a trough 80 and pumped by means of a pump 82 into a return line 84.

As developed above, the degree of dehumidification carried out in the air-to-liquid heat exchanger 70 is well below the end point condition required for introduction to the spray booth 10. This is so evaporative, rather than mechanical, cooling may be performed on the air prior to its introduction into the spray booth 10 in order to reduce its dry bulb temperature to the required level. A supply of water 86 is provided which feeds a spray nozzle array 88 contained in the ducting 90 through which the air is introduced after having passed through the space 78.

After passing over the spray nozzle array 88, the air is at the required relative humidity and dry bulb temperature, i.e., 50% RH and 75° F.

The absorption liquid is heated to a relatively elevated temperature since it absorbs relatively large quantities of latent heat of the condensed water and the heat of the solution during the dehumidification process. Also, the absorption liquid must be further heated during the regeneration or reconcentration process. This heat is eliminated by the arrangement according to the present invention to assist the cooling of the supply air during summertime conditions. Thus, the exhaust air is passed through a space 92 defined in part by surface 94, which is the undersurface of surface 76, such that both the absorption liquid and the supply air in space 78 are cooled by the exhaust air, thereby enabling extraction of the heat required to be removed to execute the proper temperature conditioning of the incoming air, eliminating the need for cooling towers and/or mechanical air conditioning equipment.

A water spray array 96 is provided to clean surface 96 and to augment this cooling effect.

It will be understood by those skilled in the art that many square feet of the heat transfer-liquid absorption contact surface area must be provided by typical applications.

Accordingly, while the schematic indication 70 indicates a single layer, practical embodiments of such a heat exchanger arrangement will require many such layers for typical application.

The absorption liquid in the return line 84 is directed into a solution interchanger 98 which provides for a heat exchange between relatively hot regenerated liquid contained in return line 100 from a regenerator 102 to precool the absorption liquid in line 74 and preheat the liquid in line 84 prior to the regeneration process. The solution interchanger 98 contains a conventional liquid-to-liquid heat exchanger.

The reconcentration process requires further heating of the absorption liquid in the line 104, carried out in a second heat exchanger, with a boiler 106 providing a flow of hot liquid or steam passing over the coils 108 to heat the absorption liquid to the required temperature prior to entry into the regenerator 102.

Regenerator 102 includes a spray nozzle array 110 which sprays the absorption liquid over an exchange surface as indicated by the screen 112 at the elevated temperature to which it is to be heated. It gives up its water in a vapor to a supply of hot air and gases introduced through ducting 114 which passes over the screen 112 thence to exhaust 116.

According to the second aspect of this version of the invention, the regenerator heat requirements are reduced by utilizing a source of secondary waste heat recovered from sources such as a paint curing oven exhaust 118. A specific system for recovering the heat from the air in the curing oven as well as exhaust from the burner combustion heating devices associated with the paint curing oven is disclosed in copending application Ser. No. 929,362, filed July 31, 1978, now abandoned.

A blower 120 receives the relatively hot gases from the plenum system described in that application, and forces the same into the ducting 114 and regenerator 102. The relatively high temperature of the gases reduces the heating of the absorption liquid required, to thus reduce the energy required in order to carry out the proper reconcentration of the absorption liquid.

The absorption liquid is thence collected in the lower region of the regenerator 102 and pumped by means of pump 122 into the line 100 for return to the heat exchanger 70, after passing through the solution interchanger 98, after it has given up a portion of its heat to the returning dilute absorption liquid in return line 84.

Figure 4:
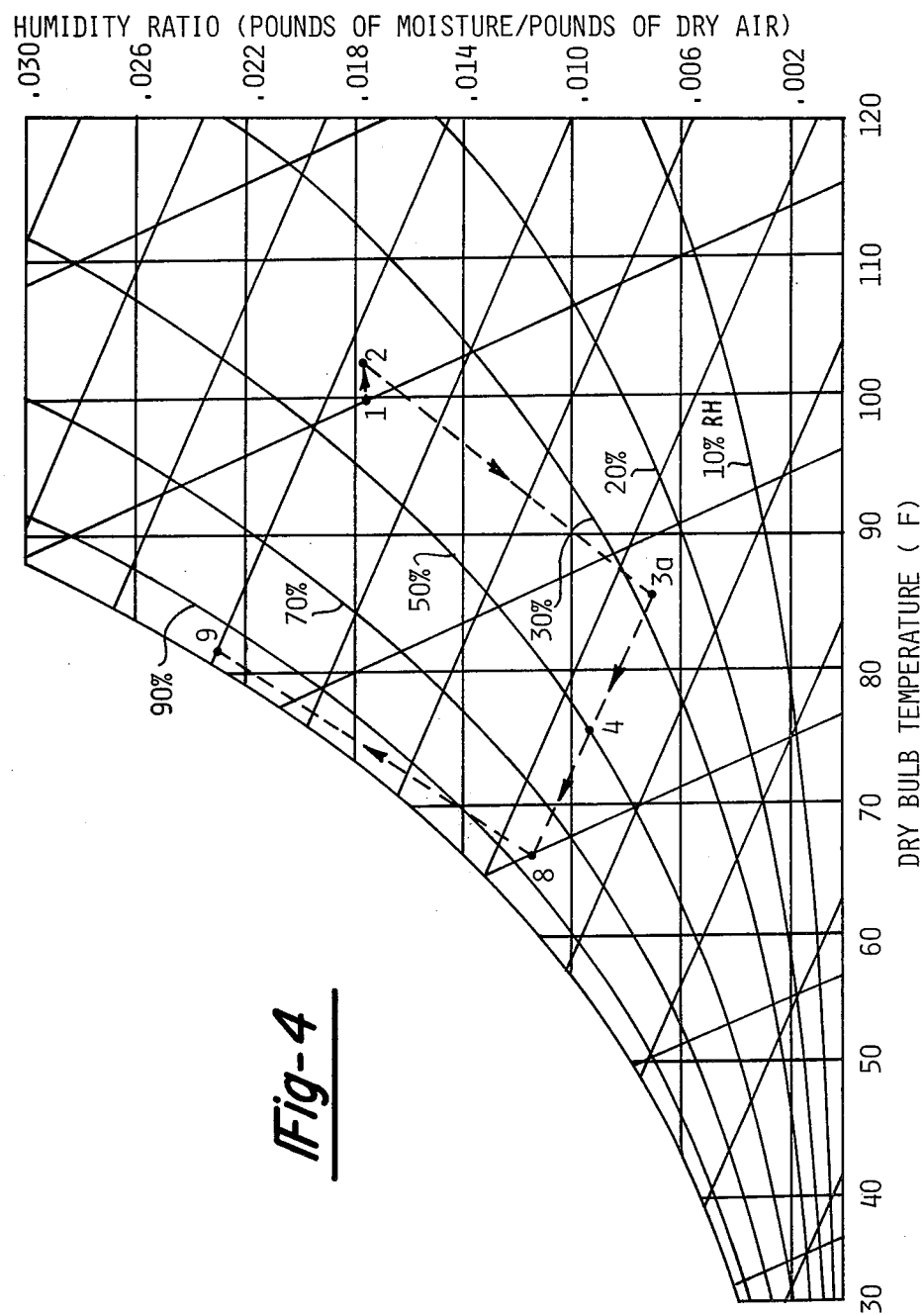
FIG. 4 is a psychrometric chart depicting the various temperature and humidity changes undergone by the supply air at various points in the system depicted in FIG. 3.

Referring to FIG. 4, the humidity and temperature conditions of the air which are achieved by this system at the various points are indicated. The incoming supply air (point 1) is 100° F. dry bulb and is at a humidity ratio of 0.0176 (pounds of moisture per pound of dry air). After passing through the supply fan, an increase in dry bulb temperature of the air (point 2) from 100° F. to 102.5° F. occurs prior to passing into and through heat exchanger 70.

The air is dehumidified therein to a humidity ratio below that which is required in order to have the proper relative humidity at the supply temperature i.e., 72° F. and 50% RH. At this point (3a), the air has been reduced in moisture content to a humidity ratio of 0.0070 and the dry bulb temperature reduced to 85° F. As the humidity ratio required in the supply booth 10 is equal to approximately 0.0093, evaporative cooling can be executed between points 3 and 4 by the water spray array 88 to reduce the dry bulb temperature to 75° F. as per requirements, and to the 50% relative humidity level (at point 4).

After passing through the paint spray booth, the temperature of the air (at point 8) has typically been reduced by evaporative cooling effects by the water filtration carried out on the exhausting air and the dry bulb temperature has been reduced to 66° F., with an increase in the humidity ratio to 0.0113.

After passing through the heat exchanger 70, the temperature of the exhaust air (point 9) has been increased to a dry bulb temperature of 82° F. with an increase in moisture level to the humidity ratio of 0.0230.

The lithium chloride solution undergoes the following condition transition as set forth in the following table:

| | LITHIUM CHLORIDE SOLUTION | | |
|---|---|---|---|
| Condition | Flow U.S. gpm | Temperature Degrees F. | Concentration % weight/LiCl |
| $A_1$ | 164 | 90 | 44 |
| $B_1$ | 173 | 80 | 42 |
| $C_1$ | 173 | 80 | 42 |
| $D_1$ | 173 | 127 | 42 |
| E | — | — | — |
| $F_1$ | 173 | 200 | 42 |
| $G_1$ | 164 | 140 | 44 |
| $H_1$ | 164 | 140 | 44 |
| $I_1$ | 164 | 90 | 44 |
| | 42% | | 44% |
| Specific Heat | 0.635 | | 0.615 |
| Specific Gravity | 1.258 | | 1.273 |

It can thus be seen that the energy requirements for the system are greatly reduced over conventional approaches inasmuch as the mechanical heating and cooling has been entirely eliminated and the heat required in order to carry out the reconcentration of the absorption liquid has likewise been greatly reduced by the use of waste heat. The energy required to circulate the various media has likewise been substantially reduced.

This also reduces the capital expense required inasmuch as the equipment is much simplified over conventional approaches.

Many variations of this approach are of course possible within the scope of the appended claims.

The embodiments of the invention in which an exclusive property or privilege is claimed are defined as follows:

1. An air conditioning system including an enclosure; means for supplying air at a predetermined temperature and humidity to said enclosure, and exhausting said air to the atmosphere after passing through said enclosure, said means including:
   liquid absorption-dehumidification means comprising means for spraying an absorption liquid into said supply air and collecting said liquid absorption liquid; means for recirculating said collected liquid to be sprayed into said supply air;
   means for cooling said circulated absorption liquid to remove the heat released in said solution by absorption liquid by said supply air, said means including heat exchanger means transferring heat from said absorption liquid into said exhaust air after said exhaust air is exhausted from said enclosure.

2. The system according to claim 1 wherein said heat exchanger means transferring heat into said exhaust air includes an extraction coil and means for passing said exhaust air through said coil and further including means for circulating a heat transfer medium through said extraction coil.

3. The system according to claim 2 further including heat pump means for extracting a portion of the heat from said heat transfer medium absorbed in cooling said absorption liquid.

4. The system according to claim 3 wherein said liquid absorption dehumidification means further includes reconcentrating means for reconcentrating said absorption liquid solution by removing moisture therefrom and wherein said heat pump means rejects heat extracted from said heat transfer medium into a portion of said dilute absorption liquid to heat said solution, and wherein said reconcentration means includes a regenerator for passing ambient air over said heated dilute absorption liquid to remove a portion of the moisture therefrom to thereby reconcentrate said solution.

5. The system according to claim 4 wherein said system further includes cooling means for cooling said air supply prior to introduction to said enclosure, said cooling means including means associated with said heat pump means for cooling a heat transfer medium and wherein said heat removed from said heat transfer medium is further rejected into said dilute solution of absorption liquid.

6. The system according to claim 4 further including means for alternatively rejecting said heat rejected by said heat pump means into a heat exchanger means for heating said incoming supply air during wintertime operation, whereby said heat pump means extracts heat from said exhaust air and rejects said heat into said heat exchanger by operation of said heat pump means.

7. The system according to claim 1 wherein said heat exchanger means for transferring heat into said exhaust air includes an air-to-liquid heat exchanger means, and means circulating said exhaust air and said absorption liquid respectively through said air-to-liquid heat exchanger.

8. The system according to claim 7 wherein said air-to-liquid heat exchanger means also includes means wherein said supply air is circulated in contact with said absorption liquid so as to also be cooled by heat exchange with said exhaust air.

9. The system according to claim 8 wherein said liquid absorption dehumidification means further includes reconcentration means for reconcentrating said absorption liquid solution by removing moisture therefrom, said reconcentration means including a regenerator passing heated gases over said heated dilute absorption liquid to remove a portion of the moisture therefrom to thereby reconcentrate said solution.

10. A method of supplying conditioned air at a predetermined humidity and temperature level to an enclosure, said conditioned air being passed through said enclosure and exhausted therefrom to the atmosphere, wherein said air supplied is taken in from the outside air during both summer and wintertime operation, the method including the steps of:
   dehumidifying said air taken in by contact with an absorption liquid and said supply air at a concentration and temperature such as to reduce said relative humidity level by condensation of ambient moisture into said absorption liquid;
   collecting said absorption liquid and recirculating said absorption liquid back into contact with said supply air;
   transferring from said absorption liquid at least a portion of the heat generated by said absorption process into the air exhausted from said enclosure by heat exchange between said exhaust air and said absorption liquid.

11. The method according to claim 10 further including the step of transferring a dilute portion of the recirculated absorption liquid, heating said diluted portion of said absorption liquid by transfer of heat from said remaining portion of absorption liquid and regenerating said heated and diluted absorption liquid by passing said heated absorption liquid into contact with ambient air, whereby a portion of said moisture is carried off.

12. The method according to claim 10 further including the step of cooling incoming air supply by transferring heat out of said air supply and into said dilute portion of said recirculated absorption liquid.

13. The method according to claim 10 wherein said step of transferring heat from said absorption liquid includes the step of passing said absorption liquid and said exhaust air through an air-to-liquid heat exchanger.

14. The method according to claim 13 wherein said dehumidification step is also carried out in said air-to-liquid heat exchanger by passing supply air therethrough in contact with said absorption liquid.

15. The method according to claim 10 further including the step of transferring a dilute portion of the recirculated absorption liquid, heating said diluted portion of said absorption liquid by transfer of heat from said remaining portion of absorption liquid and regenerating said heated and diluted absorption liquid by passing said heated absorption liquid into contact with heated gases collected from a waste heat source, whereby a portion of said moisture is carried off.

16. The method according to claim 12 further including the step of transferring heat from said exhaust air into said incoming supply air during wintertime operation.

17. An air conditioning system including:
an enclosure; means for supplying air at a predetermined temperature and humidity said enclosure and exhausting said air to the atmosphere, after passing through said enclosure said means including:
filter means for removing particulate material from said exhausted air;
liquid absorption-dehumidification means comprising means for spraying an absorption liquid into said supply air and collecting said liquid absorption liquid for recirculation;
means for cooling said circulated absorption liquid to remove the heat released in said solution by absorption of moisture from said supply air into said solution and heating of said absorption liquid by contact with said air supply, said means including heat exchanger means transferring heat from said absorption liquid into said exhaust air after said exhaust air is exhausted from said enclosure.

18. A method of conditioning air for a paint spray booth to a predetermined humidity and temperature level prior to being supplied thereto which air is passed through said spray booth, filtered and exhausted, wherein said air supplied is taken in from said outside air during both summer and wintertime operation, the method including the steps of:
dehumidifying said incoming air by contact with an absorption liquid into said supply air at a concentration and temperature such as to reduce said relative humidity level by condensation of ambient moisture into said solution;
collecting said solution and recirculating said absorption liquid back into contact with said supply air;
transferring at least a portion of the heat generated by said absorption process into the air exhausted from said enclosure by heat exchange between said absorption liquid and said exhaust air.

* * * * *